(12) United States Patent
Takahashi et al.

(10) Patent No.: US 7,303,221 B2
(45) Date of Patent: Dec. 4, 2007

(54) VEHICLE TOOL STORAGE STRUCTURE

(75) Inventors: Shinji Takahashi, Saitama (JP); Tomoko Nagamatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 481 days.

(21) Appl. No.: 10/941,933

(22) Filed: Sep. 16, 2004

(65) Prior Publication Data
US 2005/0092797 A1  May 5, 2005

(30) Foreign Application Priority Data
Sep. 24, 2003 (JP) ............................. 2003-331304

(51) Int. Cl.
*B60R 7/00* (2006.01)
(52) U.S. Cl. .............. 296/37.1; 280/769; 224/423; 224/281; 224/42.32; 224/510; 224/538
(58) Field of Classification Search ........... 296/37.1, 296/37.6; 293/103, 106; 280/769; 224/401, 224/404, 423, 425, 426, 281, 489, 491, 480, 224/496, 512, 516, 517, 42.11, 42.13, 42.32, 224/42.4, 510, 538; 312/330.1, 334.1
See application file for complete search history.

(56) References Cited

U.S. PATENT DOCUMENTS

| | | | |
|---|---|---|---|
| 2,981,554 A | 4/1961 | Mulder et al. | |
| 4,917,430 A * | 4/1990 | Lawrence | 296/37.6 |
| 6,199,930 B1 * | 3/2001 | Riley | 296/37.6 |
| 6,296,163 B1 | 10/2001 | Kitao et al. | |
| 6,923,354 B2 * | 8/2005 | Axelson | 224/404 |
| 7,165,702 B1 * | 1/2007 | Billberg | 224/401 |
| 2002/0088661 A1 | 7/2002 | Gagnon et al. | |
| 2003/0015883 A1 * | 1/2003 | Boys | 296/37.1 |
| 2003/0102970 A1 * | 6/2003 | Creel et al. | 340/568.1 |
| 2006/0186156 A1 * | 8/2006 | Harycki et al. | 224/401 |
| 2006/0219746 A1 * | 10/2006 | Kniffel et al. | 224/404 |
| 2006/0260856 A1 * | 11/2006 | Houlder | 180/89.1 |
| 2006/0266777 A1 * | 11/2006 | Huang | 224/401 |
| 2007/0000960 A1 * | 1/2007 | Hanafusa et al. | 224/401 |

FOREIGN PATENT DOCUMENTS

| | | |
|---|---|---|
| EP | 1 371 520 A2 | 12/2003 |
| JP | 5-39039 Y2 | 10/1993 |

\* cited by examiner

*Primary Examiner*—Jason S Morrow
(74) *Attorney, Agent, or Firm*—Birch, Stewart, Kolasch & Birch, LLP

(57) ABSTRACT

To make it possible to easily remove intended onboard tools and to make it possible to mount a sufficient amount of loads. With respect to a vehicle, right-and-left front wheels are rotatively mounted on a body frame. A front cover covers the body frame. The front cover is integrally formed with right-and-left fender sections to cover the right-and-left front wheels. A front carrier is disposed over the front cover for mounting loads thereon. A tool storage section is provided under the front carrier so as to store onboard tools.

18 Claims, 8 Drawing Sheets

VEHICLE TOOL STORAGE STRUCTURE

CROSS-REFERENCE TO RELATED APPLICATIONS

This nonprovisional application claims priority under 35 U.S.C. § 119(a) on Patent Application No. 2003-331304, filed in Japan on Sep. 24, 2003, the entirety of which is incorporated herein by reference.

BACKGROUND OF THE INVENTION

1. Field of the Invention

The present invention relates to a vehicle tool storage structure, which is capable of improving the removal of tools and efficiently using space.

2. Description of Background Art

A vehicle tool structure is practically available by storing tools in a cylindrical tool case and mounting this tool case to a vehicle cover.

An actual vehicle tool storage structure is satisfactorily practical when a tool case or bag is used to store tools and is stored or attached to a specified part of the vehicle.

For example, such a vehicle tool storage structure is known from Japanese Utility Model Application Publication No. 5-39039 (p. 4, FIG. 1). This document discloses a tool case attached near a rear fender of a vehicle for storing tools near a rear fender.

FIG. 8 of the present invention illustrates a vehicle tool storage structure according to the above document. A vehicle tool storage structure 200 includes rear fenders 202 to cover rear wheels 201; a rear cover 203 to link the rear fenders 202; a cylindrical tool case 204 mounted on the top surface of the rear cover 203; and bands 206 to fix the tool case 204 to the rear cover 203. In this manner, the tool case 204 is detachably placed on the rear cover 203.

The vehicle tool storage structure 200 according to the above document allows the tool case 204 to be placed on the rear cover 203. However, the tool case 204 becomes a hindrance to mounting of other loads near the rear cover and the rear fenders 202. In other words, mounting the tool case 204 on the rear cover 203 causes problems when mounting other loads.

Furthermore, the vehicle tool storage structure 200 according to the above document uses the cylindrical tool case 204 to store onboard tools (not shown). Since the onboard tools are stored in the tool case 204 in a complicated manner due to the bands 206, for example, it becomes difficult to remove an onboard tool to be used.

SUMMARY OF THE INVENTION

In view of the above, it is desired to obtain a vehicle tool storage structure that is capable of improving the removal of tools and mounting a sufficient amount of loads. It is therefore an object of the present invention to provide a vehicle tool storage structure capable of easily removing tools for use, while ensuring that a sufficient number of loads can still be mounted to the vehicle.

According to a first aspect of the present invention, a vehicle tool storage structure for a vehicle is provided that is so configured that right-and-left wheels are rotatably mounted on a body frame, a body cover covers the body frame, and right-and-left fender sections are provided integrally with or independently of the body cover to cover the right-and-left wheels. In addition, a carrier is disposed over the body cover so as to be able to mount loads and a tool storage section is provided to store onboard tools under the carrier.

It is desirable to easily remove intended onboard tools because the removal of tools can be improved. It is also desirable to store onboard tools so as not to prevent loads from being mounted because a sufficient amount of loads can be mounted.

For this purpose, the carrier is disposed over the body cover so as to be able to mount loads. The tool storage section is provided to store onboard tools under the carrier.

In other words, the carrier is disposed over the body cover so as to be able to mount loads. The tool storage section is provided to store onboard tools under the carrier. In this manner, onboard tools are stored so as not to prevent loads from being mounted.

According to a second aspect of the present invention, the tool storage section is configured as a drawable tool tray on the carrier. In this manner, intended onboard tools can be easily removed.

According to a third aspect of the present invention, the tool tray has a concave section approximately shaped to the onboard tools. In this manner, onboard tools can be stored orderly.

According to the first aspect of the present invention, the carrier is disposed over the body cover so as to be able to mount loads. The tool storage section is provided to store onboard tools under the carrier. In this manner, onboard tools can be stored so as not to prevent loads from being mounted. As a result, there is an advantage of ensuring a sufficient amount of loads.

According to the second aspect of the present invention, the tool storage section is configured as a drawable tool tray on the carrier. In this manner, intended onboard tools can be removed easily. As a result, there is another advantage of improving the removal of tools.

According to the third aspect of the present invention, the tool tray has a concave section approximately shaped to the onboard tools. There is still another advantage of orderly storing onboard tools.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
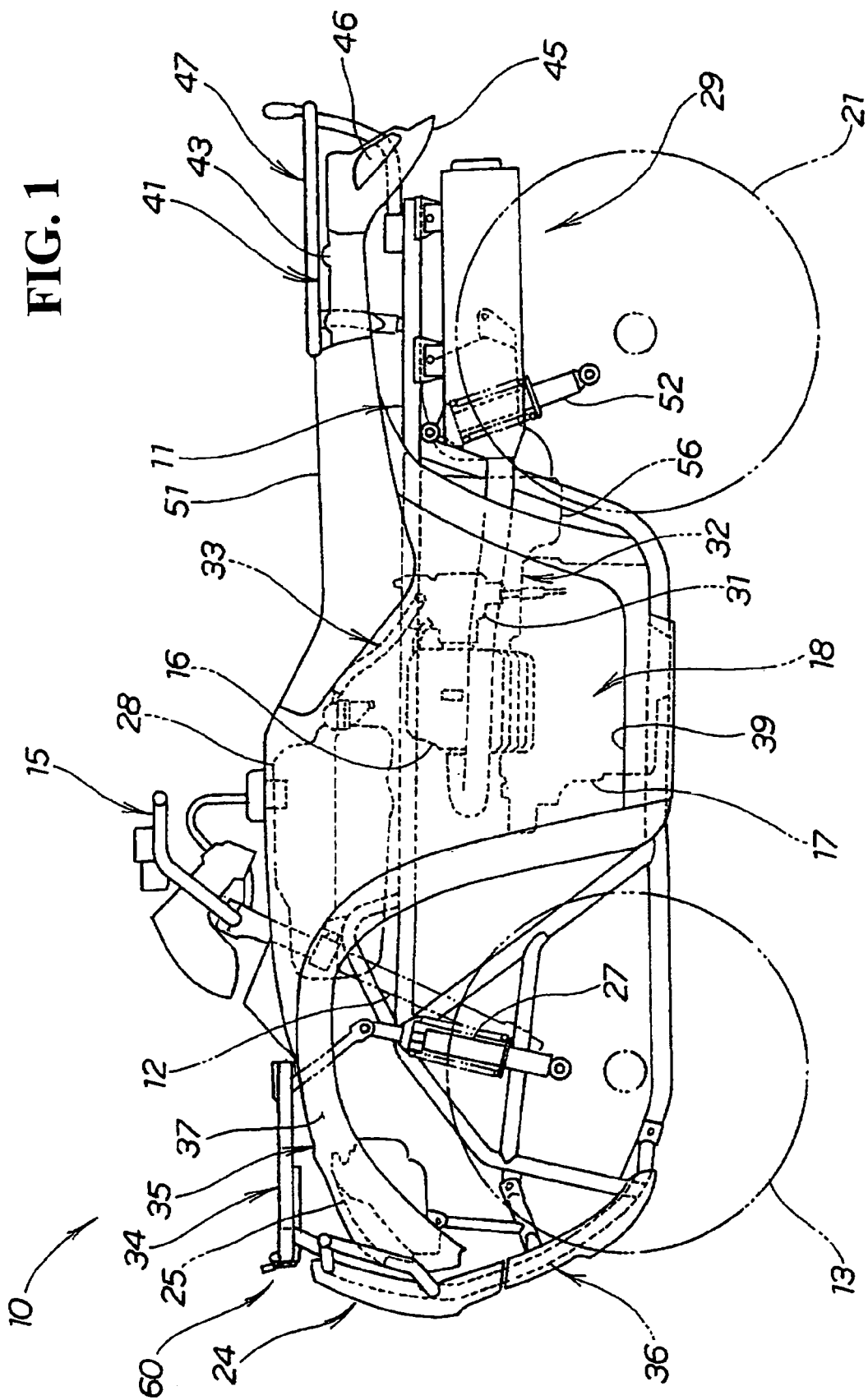
FIG. 1 is a side view of a vehicle using the tool storage structure according to an embodiment of the present invention.

The present invention will now we described with reference to the accompanying drawings, wherein the same or similar elements have been identified by the same reference numeral throughout the several views. It should also be noted that horizontal and vertical directions of the drawings are based on a direction along which reference numerals are described.

FIG. 1 is a side view of a vehicle that uses the tool storage structure according to an embodiment of the present invention. A vehicle 10 represents vehicles used on uneven roads. A steering shaft 12 is mounted on the front of a body frame 11. The bottom of the steering shaft 12 is coupled to right-and-left front wheels 13 and 14. FIG. 1 shows only the front wheel 13 nearer to the viewer. A handle 15 is mounted on the top of the steering shaft 12. A middle of the body frame 11 is mounted with a power unit comprising an engine 16 and a transmission 17. Rear wheels 21 and 22 are disposed at the rear of the body frame 11 and are driven by the power unit 18 together with the front wheels 13 and 14. FIG. 1 shows only the rear wheel 21 nearer to the viewer.

Further in FIG. 1, reference numeral 24 identifies a front grille to cover the body front. Reference numeral 25 identifies a headlamp (only the headlamp 25 nearer to the viewer is shown in FIG. 1). Reference numeral 27 identifies a shock absorber for the front wheels 13 and 14 (only one shock absorber 27 is shown in FIG. 1). Reference numeral 28 identifies a fuel tank mounted on the body frame 11. Reference numeral 29 identifies an exhaust system that is connected to the front of the engine 16 and is bent toward the rear. Reference numeral 31 identifies a carburetor connected to the rear of the engine 16. Reference numeral 32 identifies an air cleaner system connected to the rear of the carburetor 31. Reference numeral 33 identifies an air vent for causing atmospheric pressure on a fuel surface of a float chamber provided in the carburetor 31. Reference numeral 34 identifies a front carrier for mounting loads. Reference numeral 35 identifies a front cover to be used as a body cover for covering the front of the body. Reference numeral 36 identifies a carrier stay (carrier pipe) mounted on the body frame 11. Reference numerals 37 and 38 identify right-and-left fenders (only the left fender 37 is shown in FIG. 1) that are formed integrally with the front cover 35 to cover the top and the rear of the front wheels 13 and 14. Reference numeral 39 identifies a step (only the left step is shown in FIG. 1) where a driver's foot is to be placed. Reference numeral 41 identifies a rear cover to cover the rear of the body. Reference numerals 43 and 44 identify right-and-left rear fenders (only the left rear fender 43 is shown in FIG. 1) that are formed with the rear cover 41 to cover the front and the top of the rear wheels 21 and 22. Reference numeral 45 identifies a mud guard (only one mud guard 45 is shown in FIG. 1) each mounted on the rear fenders 43 and 44. Reference numeral 46 identifies a tail lamp (only one tail lamp 46 is shown in FIG. 1) each mounted on the mud guards 45. Reference numeral 47 identifies a rear carrier mounted on the rear cover and above the rear fenders 43 and 44. Reference numeral 51 identifies a seat and reference numeral 52 identifies a shock absorber (only one shock absorber 52 is shown in FIG. 1) for the rear wheels 21 and 22.

Figure 2:
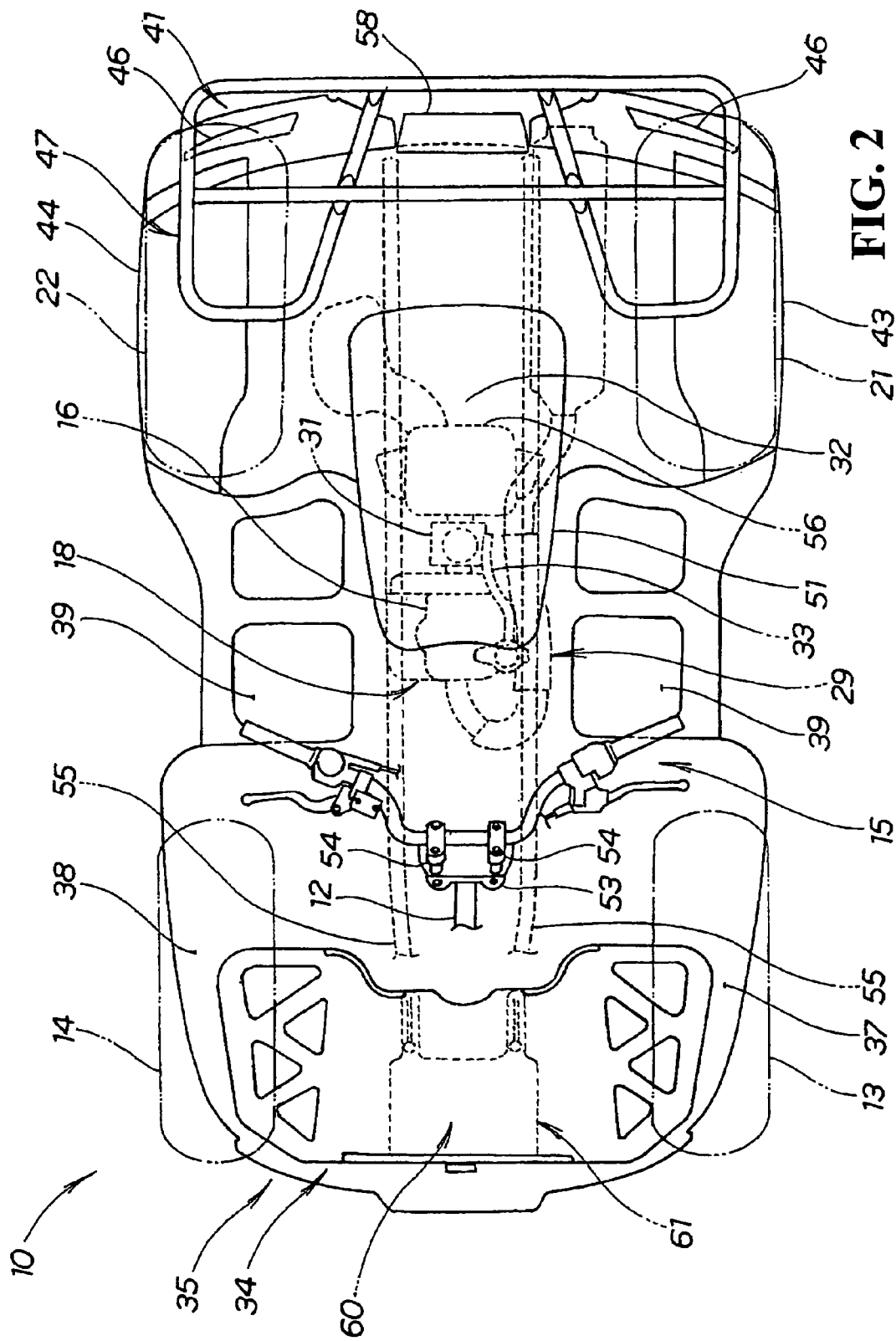
FIG. 2 is a plan view of a vehicle using the tool storage structure according to the present invention.

FIG. 2 is a top view of the vehicle that uses the tool storage structure according to the present invention. Right-and-left main frames 55 constitute part of the body frame 11 and are disposed in the center of the body so as to extend along a cross direction. Between the main frames 55, a power unit 18, the carburetor 40 and a main air cleaner 56 constituting the air cleaner system 32 are disposed. The exhaust system 29 is bent in a U shape from the engine 16 and is extends toward the rear.

A handle supporting member 53 is mounted above the steering shaft 12. The handle 15 is mounted on the handle supporting member 53 via handle clamping members 54. The mud guards 45 are disposed on the right and left sides of the body so as to sandwich a license plate 58.

Figure 3:
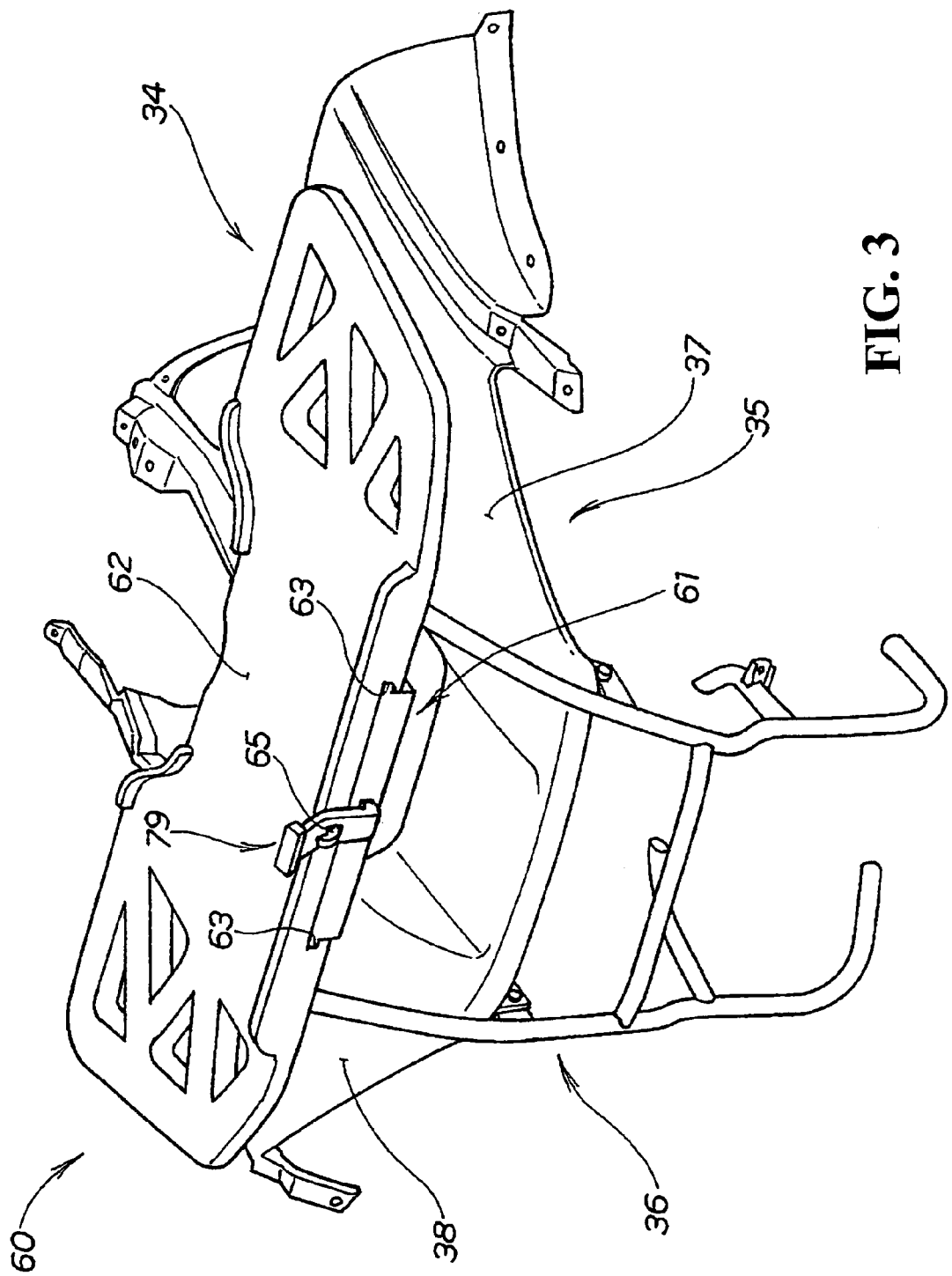
FIG. 3 is a partial side view of the vehicle tool storage structure according to the present invention.

FIG. 3 is a partial side view of the vehicle tool storage structure according to the present invention. The vehicle tool storage structure 60 includes a front cover 35 having right-and-left fender sections 37 and 38 to cover the right-and-left front wheels 13 and 14 (see FIG. 2), respectively. A front carrier 34 is provided above the front cover 35 to mount loads. A tool storage structure 61 is provided under the front carrier 34 to store onboard tools.

Figure 4:
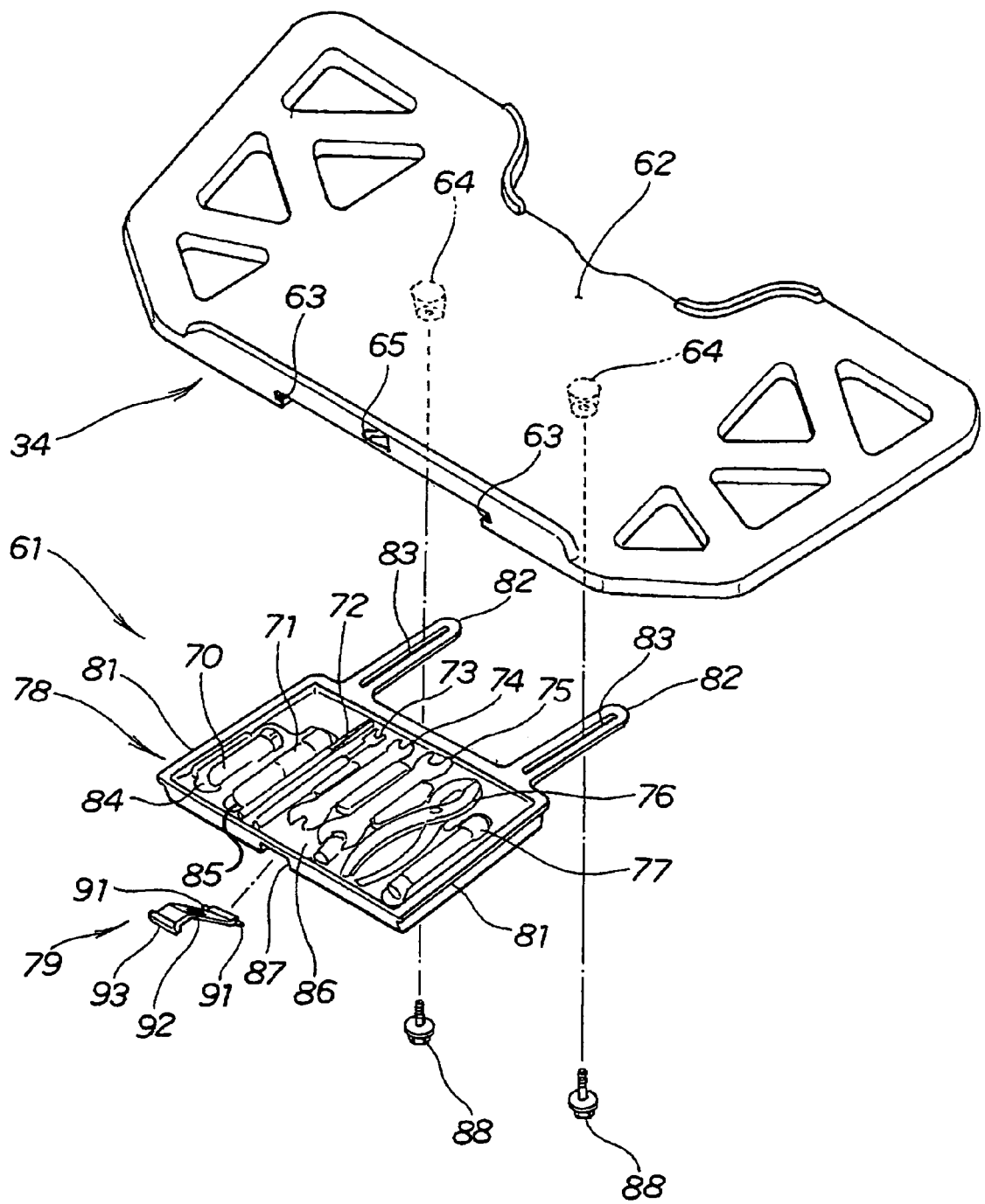
FIG. 4 is an exploded perspective view of the vehicle tool storage structure according to the present invention.

FIG. 4 is an exploded perspective view of the vehicle tool storage structure according to the present invention. The front carrier 34 includes a mounting section 62 for mounting loads. Right-and-left guide grooves 63 are formed under the front of the mounting section 62 to drawably guide the tool storage section 61. In other words, the guide grooves 63 slidably guide the tool storage section 61 in the same manner as a draw is guided in a piece of furniture, for example. Right-and-left mounting bosses 64 are formed under the mounting section 62 to drawably mount the tool storage section 61. A hook section 65 is formed on the front of the mounting section 62 to hook the tool storage section 61.

Specifically, the tool storage section 61 is a tool tray drawably mounted on the front carrier 34. The tool storage section 61 includes a tray body 78 for storing onboard tools 70 through 77 and a hook lever 79 rotatably mounted on the tray body 78 to be engaged with the hook section 65.

The tray body 78 includes right-and-left rails 81 formed on both sides thereof to each engage with right-and-left guide grooves 63. Extended sections 82 extend from the rear and long holes 83 are formed in each of the extended sections 82. Concave sections 84 through 86 approximately match the shapes of onboard tools 70 through 77. A mounting section 87 is provided to rotatably mount the hook lever 79.

The concave section 84 approximately matches an onboard tool 70. The concave section 85 approximately matches an onboard tool 71. The concave section 86 approximately matches onboard tools 72 through 77. Reference numerals 88 denote bolts (screws) that are fit to mounting bosses 64 to slidably guide the long holes 83.

The hook lever 79 includes projections 91 fit to the mounting section of the tray body 78. An aperture 92 engages with the hook section 65 and a tab 93 engages with or disengages from the hook section 65.

Figure 5:
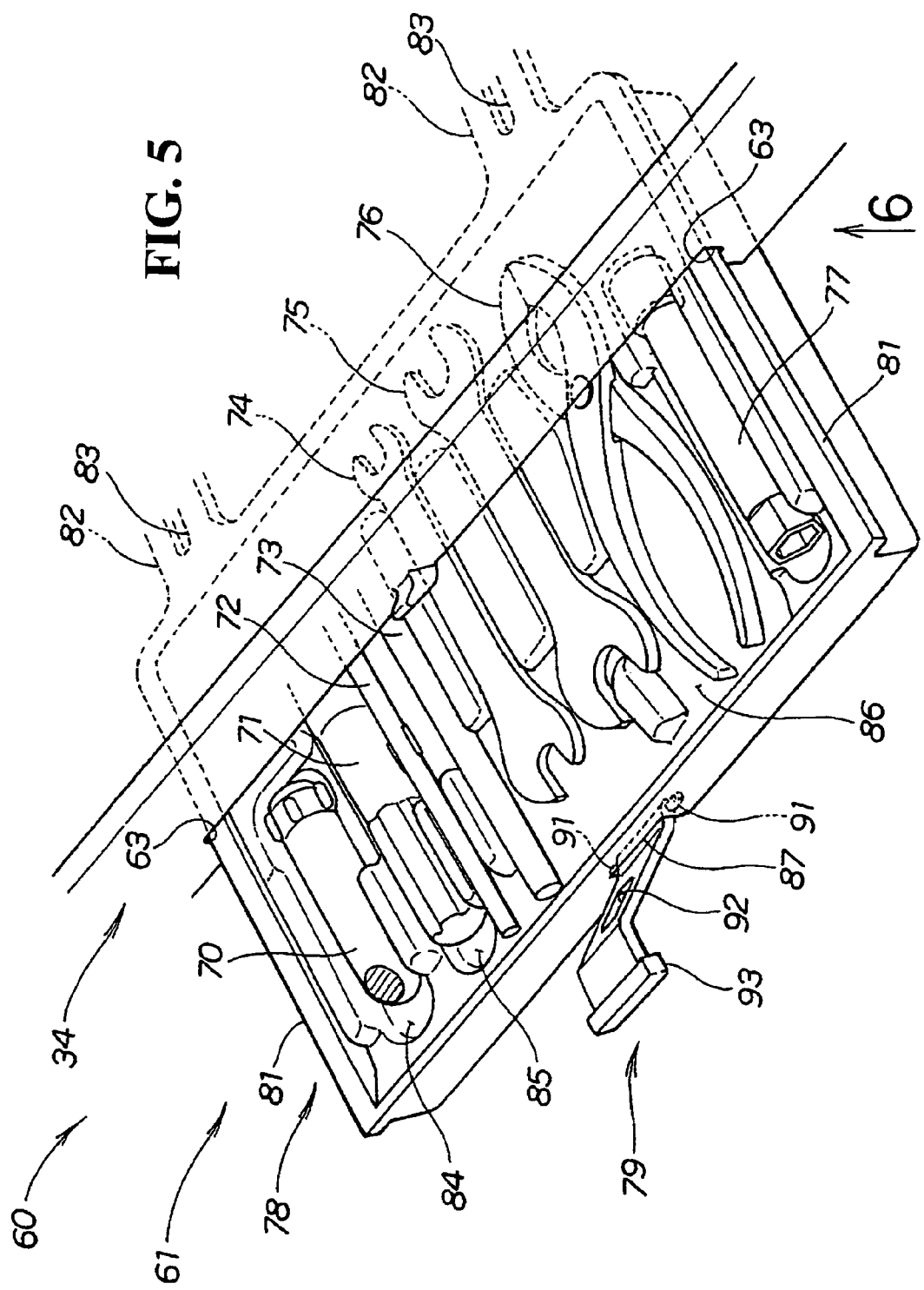
FIG. 5 is a perspective view showing that the tool storage section is drawn from the vehicle tool storage structure according to the present invention.

FIG. 5 is a perspective view showing that the tool storage section is drawn from the vehicle tool storage structure according to the present invention. The vehicle tool storage structure 60 is used with the vehicle 10 configured as follows. The body frame 11 is rotatively mounted with the right-and-left front wheels (wheels) 13 and 14 as shown in FIG. 2. The front cover (body cover) 35 covers the body frame 11. The front cover 35 is integrally formed with the right-and-left fender sections 37 and 38 to cover the right-and-left front wheels 13 and 14. The front carrier (carrier) 34 is disposed over the front cover 35 to mount loads. The tool storage section (tool tray) 61 is provided under the front carrier 34 so as to store the onboard tools 70 through 77.

For example, it is preferable to easily take out intended onboard tools because the operability of taking out tools can be improved. It is also preferable to store onboard tools so as not to prevent loads from being mounted because a sufficient amount of loads can be mounted.

In other words, the front carrier (carrier) 34 is disposed over the front cover (body cover) 35 so as to be able to mount loads. The tool storage section (tool tray) 61 is provided to store the onboard tools 70 through 77 under the front carrier 34. In this manner, the onboard tools 70 through 77 can be stored so as not to prevent loads from being mounted. As a result, it is possible to ensure a sufficient amount of loads.

The vehicle tool storage structure 60 may be also considered to be the tool storage section (tool tray) 61 having the concave sections 84 through 86 approximately matching the shapes of the onboard tools 70 through 77.

The tool storage section (tool tray) 61 has the concave sections 84 through 86 approximately matching the shapes of the onboard tools 70 through 77. The onboard tools 70 through 77 can be stored orderly. As a result, it is possible to improve the removal of the tools.

Figure 6:
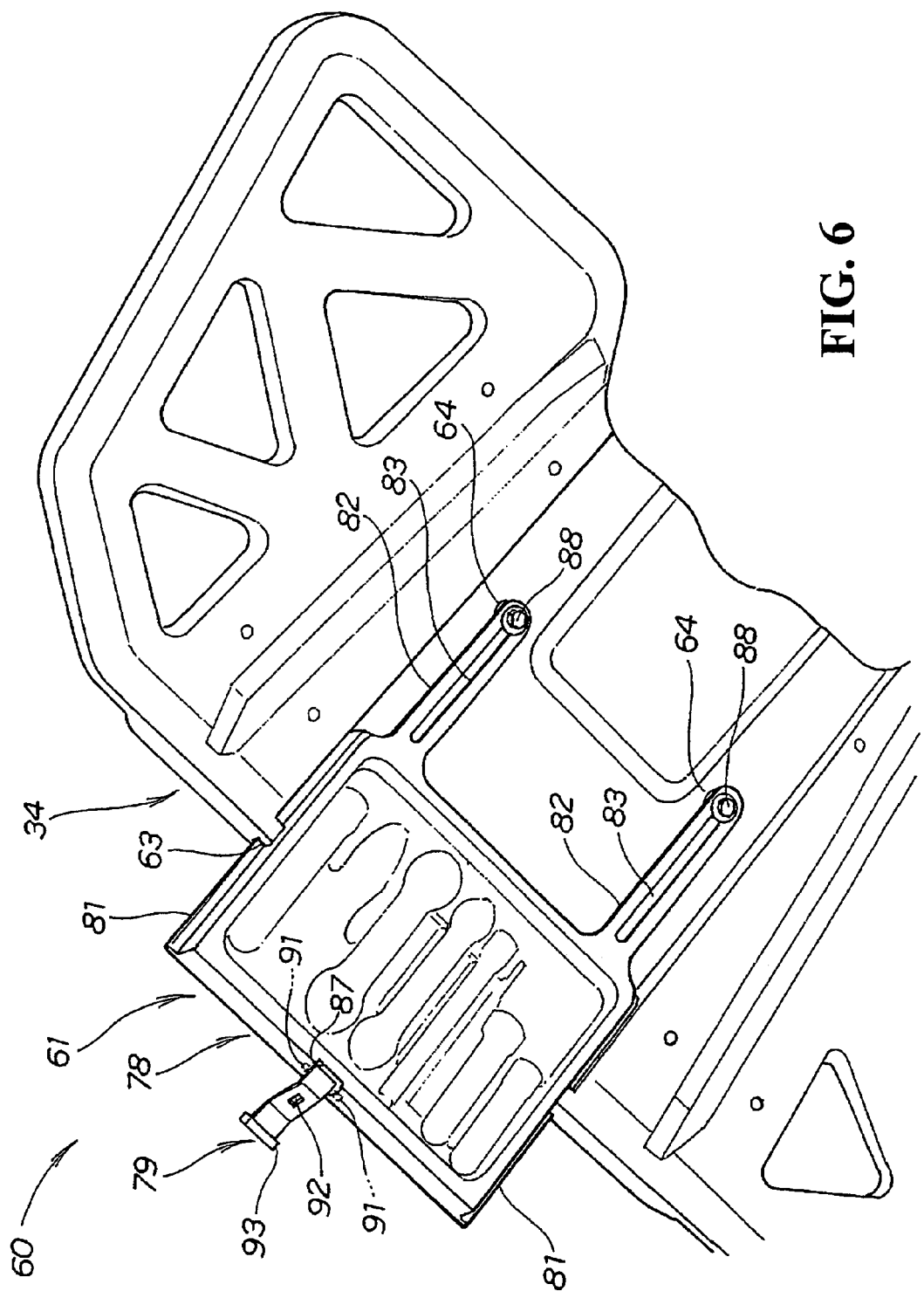
FIG. 6 is a perspective view taken in the direction of the arrow of FIG. 5.

FIG. 6 is a perspective view taken in the direction of the arrow 6 in FIG. 5 and shows the bottom of the vehicle tool storage structure 60. The vehicle tool storage structure 60 includes the tool storage section 61 being provided as a drawable tool tray on the front carrier (carrier) 34. Since the tool storage section 61 is provided as a drawable tool tray on the front carrier (carrier) 34, the intended onboard tools 70 through 77 (see FIG. 5) can be taken out easily.

Figure 7:
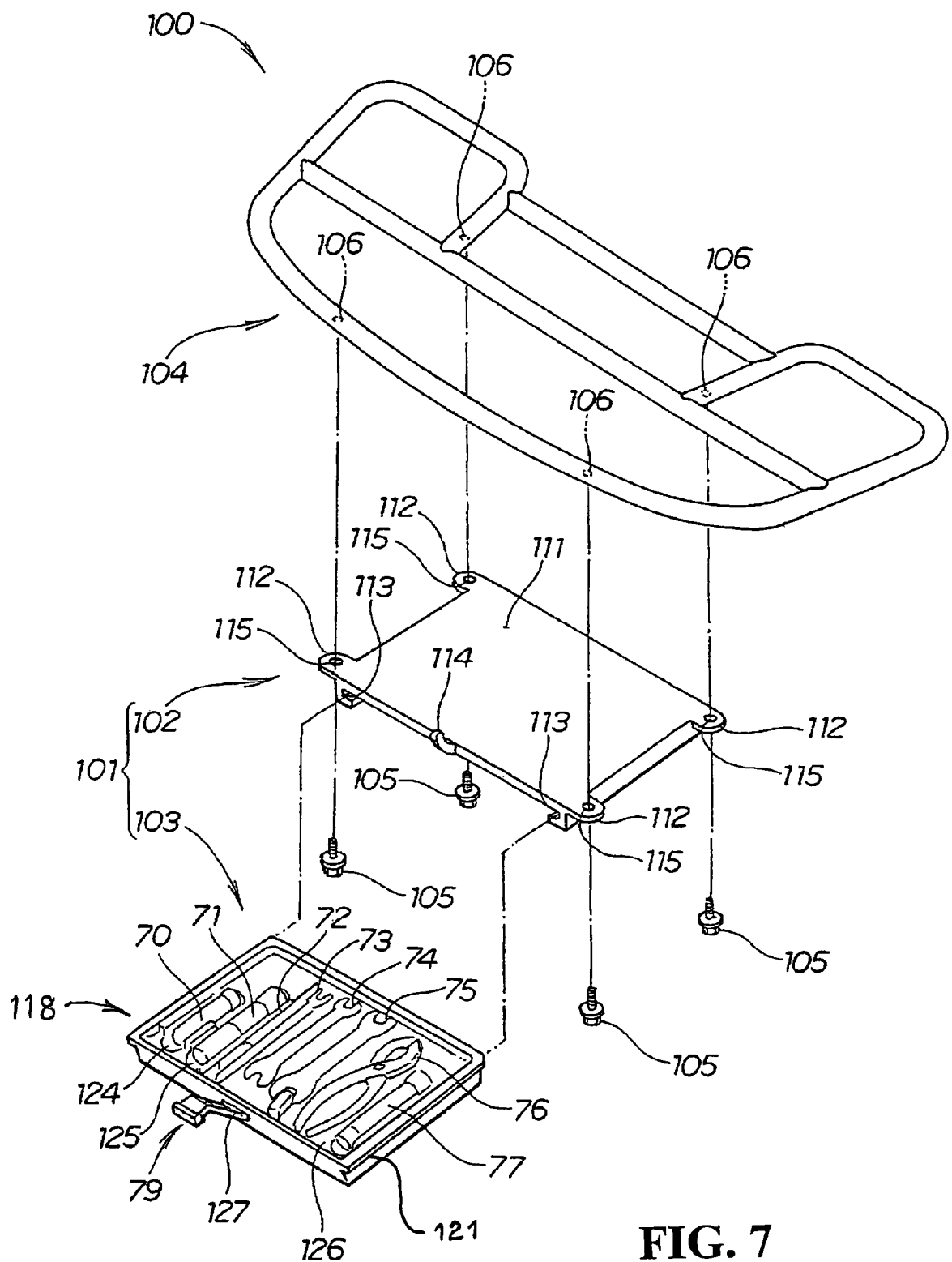
FIG. 7 is an exploded perspective view of the vehicle tool storage structure according to another embodiment of the present invention.
Figure 8:
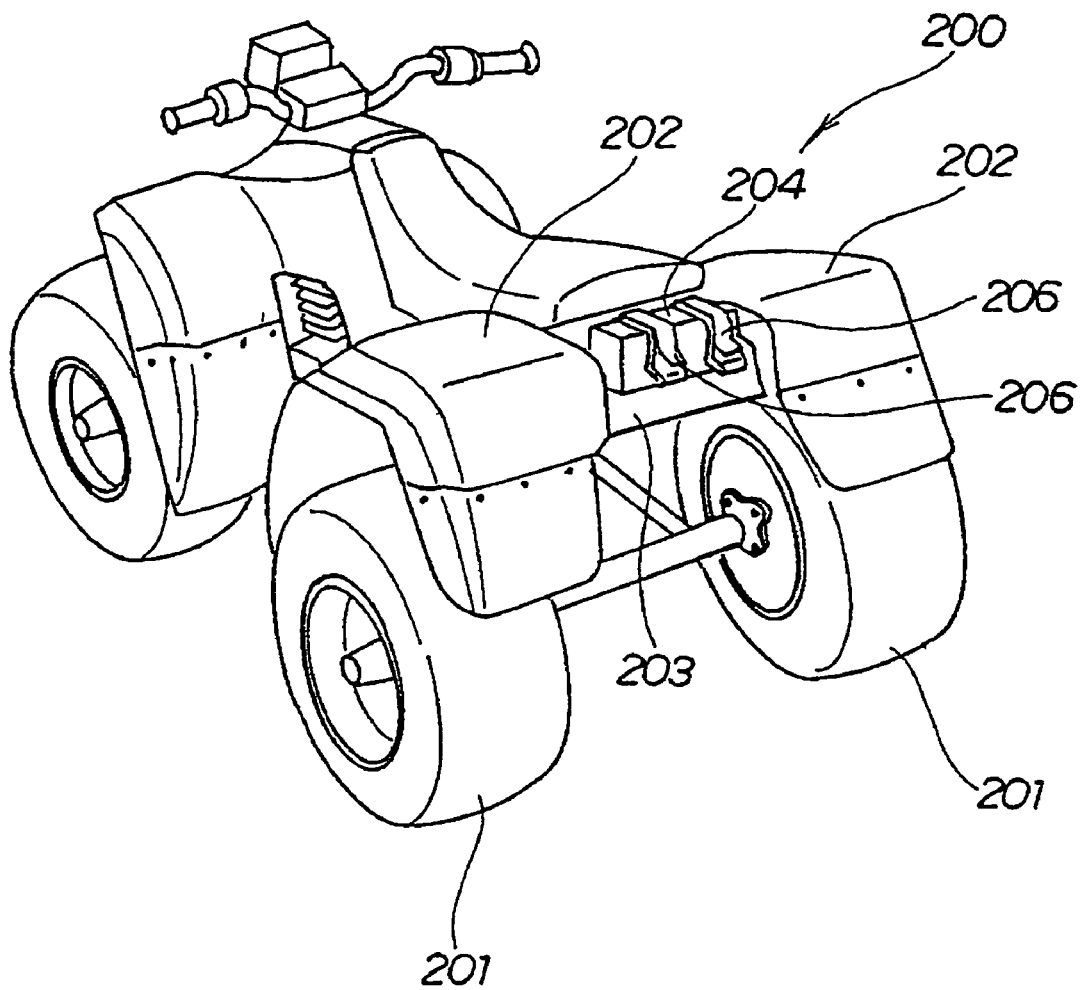
FIG. 8 illustrates a tool storage structure according to the background art.

FIG. 7 is an exploded perspective view of the vehicle tool storage structure according to another embodiment of the present invention. The same reference numerals are used to depict the same parts as used for the vehicle tool storage structure 60 (see FIGS. 2 and 4). Therefore, a detailed description thereof has been omitted for simplicity.

A vehicle tool storage structure 100 includes the front cover 35 (see FIG. 3), a front carrier 104, and a tool storage section 101. The front cover 35 includes the right-and-left fender sections 37 and 38 to cover the right-and-left front wheels 13 and 14 (see FIG. 2), respectively. The front carrier 104 is made of pipes and is provided over the front cover 35 in order to mount loads thereto. The tool storage section 101 is provider under the front carrier 104 for storing the onboard tools 70 through 77 therein.

The tool storage section 101 includes a storage base 102 and a tool tray 103. The storage base 102 is attached to the front carrier 104. The tool tray 103 is drawably mounted on the storage base 102 and stores the onboard tools 70 through 77.

Reference numerals 105 identify bolts for mounting storage base 102 on the front carrier 104. Reference numerals 106 identify bolt holes formed in the front carrier 104.

The storage base 102 is formed with support sections 112 that are formed in a body 111 to be fixed to the front carrier 104. Right-and-left guide grooves 113 are formed under the body 111. A hook section 114 is provided to hook the tool tray 103. The support sections 112 are formed with through holes 115 for inserting the bolts 105, respectively.

The tool tray 103 includes a tray body 118 to store the onboard tools 70 through 77. The hook lever 79 is rotatably mounted on the tray body 118 for engaging with the hook section 114.

The tray body 118 includes right-and-left rails 121 formed on both sides thereof to each engage with the right-and-left guide grooves 113, respectively. Concave sections 124 through 126 approximately matching the shapes of the onboard tools 70 through 77 are provided. A mounting section 127 is provided for rotatably mounting the hook lever 79.

While the vehicle tool storage structure 60 according to the present invention includes the tool storage section 61 formed on the front carrier 34 as shown in FIG. 3, the present invention is not limited thereto. The tool storage section may be provided on the rear carrier.

While the vehicle tool storage structure 60 according to the present invention is provided with the common concave section 86 to store the onboard tools 72 through 77 as shown in FIG. 5, the present invention is not limited thereto. Individual concave sections may be provided to store individual onboard tools.

The vehicle tool storage structure according to the present invention is appropriately applicable to other vehicles as well, including vehicles used on uneven roads such as 4-wheel buggy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle tool storage structure for a vehicle, the vehicle including right-and-left wheels rotatably mounted on a body frame, a body cover covering the body frame, and right-and-left fender sections provided integrally with or independently of the body cover to cover the right-and-left wheels, said vehicle tool storage structure comprising:

a carrier disposed over the body cover, said carrier including a mounting section that is capable of mounting loads thereon;

a tool storage section, said tool storage section being provided under said carrier for storing onboard tools and being moveable in a first direction toward an opened position; and at least one extension section extending from the tool storage section, the at least one extension section having a long hole engaged with the carrier, the tool storage section being moveable in a range of a length of the long hole.

2. The vehicle tool storage structure according to claim 1, wherein said tool storage section is configured as a drawable tool tray on said carrier.

3. The vehicle tool storage structure according to claim 2, wherein said tool tray has a concave section approximately shaped to the onboard tools.

4. The vehicle tool storage structure according to claim 1, wherein said carrier further comprises a pair of guide grooves formed under said mounting section, said pair of guide grooves receiving said tool storage section.

5. The vehicle tool storage structure according to claim 4, wherein said carrier further comprises a hook section formed on said mounting section for hooking the tool storage section.

6. The vehicle tool storage structure according to claim 1, wherein said tool storage section comprises:
  a tray body to store onboard tools; and
  a hook lever, said hook lever being engageable with a hook section on said carrier to keep the tool storage section in a closed position.

7. The vehicle tool storage structure according to claim 6, wherein said tray body comprises a pair of guide rails formed on opposite sides thereof, said pair of guide rails being in slidable engagement with cooperating guide grooves formed in said carrier.

8. A vehicle, comprising:
  a body frame;
  right-and-left wheels rotatably mounted on said body frame;
  a body cover covering said body frame;
  right-and-left fender sections provided integrally with or independently of said body cover to cover said right-and-left wheels; and
  a vehicle tool storage structure, said vehicle tool storage structure comprising:
    a carrier disposed over said body cover, said carrier including a mounting section that is capable of mounting loads thereon;
    a tool storage section, said tool storage section being provided under said carrier for storing onboard tools and being moveable in a first direction toward an opened position; and
    at least one extension section extending from the tool storage section, the at least one extension section having a long hole engaged with the carrier, the tool storage section being moveable in a range of a length of the long hole.

9. The vehicle according to claim 8, wherein said tool storage section is configured as a drawable tool tray on said carrier.

10. The vehicle according to claim 9, wherein said tool tray has a concave section approximately shaped to the onboard tools.

11. The vehicle according to claim 8, wherein said carrier further comprises a pair of guide grooves formed under said mounting section, said pair of guide grooves receiving said tool storage section.

12. The vehicle according to claim 11, wherein said carrier further comprises a hook section formed on said mounting section for hooking the tool storage section.

13. The vehicle according to claim 8, wherein said tool storage section comprises:
  a tray body to store onboard tools; and
  a hook lever, said hook lever being engageable with a hook section on said carrier to keep the tool storage section in a closed position.

14. The vehicle according to claim 13, wherein said tray body comprises a pair of guide rails formed on opposite sides thereof, said pair of guide rails being in slidable engagement with cooperating guide grooves formed in said carrier.

15. The vehicle tool storage structure according to claim 1, wherein the long hole of the extension section has a groove with two closed ends, a screw below the mounting section and engaging the tool storage section with the carrier, the screw catching the closed ends and avoiding the tool storage section to come off from the carrier.

16. The vehicle tool storage structure according to claim 1, wherein the at least one extension section extends from the tool storage section in a direction opposite to the first direction.

17. The vehicle tool storage structure according to claim 8, wherein the long hole of the extension section has a groove with two closed ends, a screw below the mounting section and engaging the tool storage section with the carrier, the screw catching the closed ends and avoiding the tool storage section to come off from the carrier.

18. The vehicle tool storage structure according to claim 8, wherein the at least one extension section extends from the tool storage section in a direction opposite to the first direction.

* * * * *